United States Patent
Park et al.

(10) Patent No.: US 8,495,673 B2
(45) Date of Patent: Jul. 23, 2013

(54) METHOD AND APPARATUS FOR PROVIDING AND USING CONTENT ADVISORY INFORMATION ON INTERNET CONTENTS

(75) Inventors: Jung-shin Park, Suwon-si (KR); Kwang-hyuk Kim, Suwon-si (KR); Sung-wook Ahn, Seoul (KR); Sung-wook Byun, Suwon-si (KR); Sang-woong Lee, Suwon-si (KR); Eun-hee Rhim, Yongin-si (KR); O-hoon Kwon, Suwon-si (KR); Sung-jin Park, Suwon-si (KR); In-chul Hwang, Suwon-si (KR); Mun-jo Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 399 days.

(21) Appl. No.: 12/272,106

(22) Filed: Nov. 17, 2008

(65) Prior Publication Data

US 2009/0288111 A1    Nov. 19, 2009

(30) Foreign Application Priority Data

May 13, 2008    (KR) .................. 10-2008-0044017

(51) Int. Cl.
*H04N 5/445*    (2011.01)
*H04N 7/173*    (2011.01)
*H04N 7/16*    (2011.01)

(52) U.S. Cl.
USPC .............. 725/28; 725/51; 725/52; 725/114; 725/118; 725/135

(58) Field of Classification Search
USPC ................. 725/37, 46, 51–54, 114, 118, 135
See application file for complete search history.

(56) References Cited

U.S. PATENT DOCUMENTS

| 2003/0051238 A1* | 3/2003 | Barone, Jr. .................... 725/32 |
| 2006/0064716 A1* | 3/2006 | Sull et al. ....................... 725/37 |
| 2008/0256575 A1* | 10/2008 | Raju et al. ..................... 725/39 |
| 2008/0282309 A1* | 11/2008 | Kim et al. .................... 725/117 |
| 2009/0178094 A1* | 7/2009 | Thomas et al. .............. 725/109 |

FOREIGN PATENT DOCUMENTS

| KR | 10-2003-0006817 A | 1/2003 |
| KR | 10-2005-0076788 A | 7/2005 |
| KR | 10-2006-0037043 A | 5/2006 |

* cited by examiner

Primary Examiner — Kieu Oanh T Bui
(74) Attorney, Agent, or Firm — Sughrue Mion, PLLC (57) ABSTRACT

Provided are a method and apparatus for providing and using content advisory (CA) information on Internet contents. A method of providing CA information by using a CA information server, includes receiving a request for the CA information on a content, from an Internet Protocol television (IPTV); searching for CA information on the content; and transmitting the found CA information to the IPTV. A method of using CA information when an IPTV reproduces a content not having the CA information, according to the present invention, includes transmitting a request for CA information, to a CA information server; receiving the CA information from the CA information server; analyzing the CA information; and applying the CA information.

20 Claims, 9 Drawing Sheets

```
<SegmentInformation
    segmentId="pgSegment1">
  <Description>
    <oif:ParentalGuide>
      PG-13
    </oif:ParentalGuide>
  </Description>
  <SegmentLocator>
    <MediaRelTimePoint>
      PT00H20M14S
    </MediaRelTimePoint>
    <MediaDuration>
      PT00H23M17S
    </MediaDuration>
  </SegmentLocator>
</SegmentInformation>
```

FIG. 10

```
<contentAdvisoryDescriptor>
<default>
<region="0x01">
<rating="G">                    50
</default>
<frame value="154" duration="94">
<phobia="snake">
</frame>
<frame value="364" duration="177">
<phobia="George W. Bush">
</frame>
</contentAdvisoryDescriptor>
                                60
```

FIG. 11

METHOD AND APPARATUS FOR PROVIDING AND USING CONTENT ADVISORY INFORMATION ON INTERNET CONTENTS

CROSS-REFERENCE TO RELATED PATENT APPLICATION

This application claims priority from Korean Patent Application No. 10-2008-0044017, filed on May 13, 2008 in the Korean Intellectual Property Office, the disclosure of which is incorporated herein in its entirety by reference.

BACKGROUND OF THE INVENTION

1. Field of the Invention

Methods and apparatuses consistent with the present invention relate to content advisory (CA) information on multimedia contents, and more particularly, to generating CA information on contents existing all over the Internet, and using the CA information.

2. Description of the Related Art

From the beginning of the $21^{st}$ century, the fields of broadband broadcasting and data communication have been rapidly combining. Data communication service providers have competitively entered into the market of broadcasting and are making efforts to cross the boundary between broadcasting and data communication, and broadcasting service providers have been alerted against such occurrences and are making efforts to draw an Internet Protocol (IP)-based broadcasting market into their field.

No matter which side takes the upper hand, one definite fact is that people can now very easily access contents on the Internet, through a television (TV) in a living room. Conventionally, a typical TV is a very conservative device in comparison to a personal computer (PC). In general, a PC is used by an individual while the TV is shared by a whole family. Thus, conventional contents provided by TV broadcasting service providers are produced through self censorship and also viewing age ratings are determined in accordance with strict standards.

However, if Internet Protocol televisions (IPTVs) become popular, content providers will not be restricted to only broadcasting stations and all users using the Internet can provide self-produced contents (for example, user created contents (UCC)). Thus, it is obvious that the amount of contents that could be viewed through the TV will increase exponentially. However, a variety of contents on the Internet are produced without the censorship, and no one is appointed to determine their content advisory (CA) ratings. Accordingly, when IPTVs become popular, a method of blocking harmful contents on the Internet will be regarded as a very important issue. Most existing CA standards have been formed on the basis of a conventional broadcasting environment and thus a new method of providing CA information is required in a new IPTV era.

Figure 1:
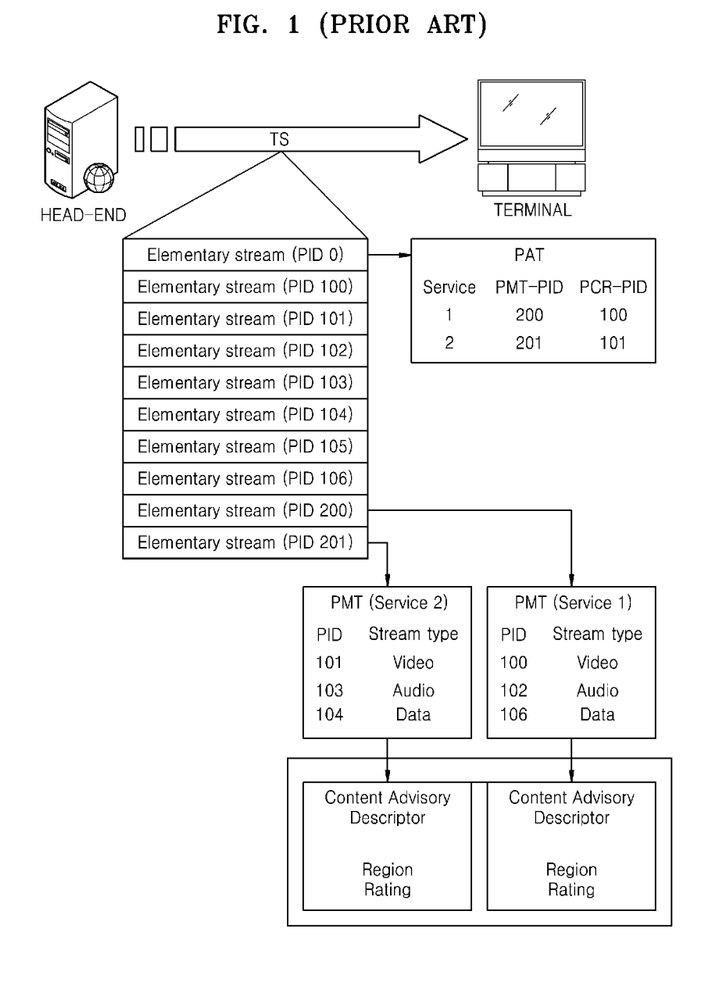
FIG. 1 is a diagram illustrating a method of transmitting a broadcasting stream according to the ATSC standard.

FIG. 1 is a diagram illustrating a method of transmitting a broadcasting stream according to the Advanced Television Systems Committee (ATSC) standard that is one kind of terrestrial digital TV broadcasting standard.

Referring to FIG. 1, a head-end transmits a transport stream (TS) to a terminal. One TS includes a plurality of elementary streams (ESs). A program map table (PMT) includes information on each service unit (including one or more events) in an ES. A CA descriptor is linked to each PMT and this CA descriptor provides CA information (for example, a parental rating) of an event.

The CA information is preset in the terminal and thus, the terminal determines whether to allow viewing of a content by comparing the CA information included in the CA descriptor of the received TS, and the CA information that is preset in the terminal.

However, a conventional method of providing CA information requires a stream generator and can be applied only to certain types of broadcasting streaming (for example, ATSC streaming). Thus, if a content which exists on the Internet is arbitrarily downloaded and reproduced (for example, an IP-based steaming service), the conventional method may not be applied.

Also, conventional CA information is defined in units of events and thus a PMT has to be continuously updated in order to provide the CA information in more specified units (for example, in units of frames). Accordingly, the system may be prone to overload.

SUMMARY OF THE INVENTION

The present invention provides a method and apparatus for efficiently and reasonably providing CA information when contents on the Internet are viewed.

According to an aspect of the present invention, there is provided a method of providing CA information by using a CA information server, the method including receiving a request for CA information on a content, from an IPTV; searching for CA information on the content; and, transmitting the found CA information to the IPTV.

According to another aspect of the present invention, there is provided a method of using CA information when an IPTV reproduces a content not having CA information, the method including transmitting a request for CA information, to a CA information server; receiving the CA information from the CA information server; analyzing the CA information; and applying the CA information.

According to another aspect of the present invention, there is provided a CA information server including a CA information storage unit for storing CA information; a content identification (ID) analysis unit for analyzing an ID of a content requiring the CA information; and a CA information search unit for searching the CA information storage unit in order to obtain the CA information, by using the ID of the content, in accordance with a request of an Internet protocol television (IPTV).

According to another aspect of the present invention, there is provided a CA information management system including an Internet for providing multimedia contents; a CA information server for providing CA information on the multimedia contents; and an IPTV for controlling reproduction of the multimedia contents by using the CA information.

According to another aspect of the present invention, there is provided a computer readable recording medium having recorded thereon a computer program for executing a method of providing CA information by using a CA information server, the method including receiving a request for CA information on a content, from an IPTV; searching for CA information on the content; and transmitting the found CA information to the IPTV.

According to another aspect of the present invention, there is provided a computer readable recording medium having recorded thereon a computer program for executing a method of using CA information when an IPTV reproduces a content not having the CA information, the method including transmitting a request for CA information, to a CA information server; receiving the CA information from the CA information server; analyzing the CA information; and applying the CA information.

BRIEF DESCRIPTION OF THE DRAWINGS

The above and other aspects of the present invention will become more apparent by describing in detail exemplary embodiments thereof with reference to the attached drawings in which.

DETAILED DESCRIPTION OF EXEMPLARY EMBODIMENTS OF THE INVENTION

Hereinafter, the present invention will be described in detail by explaining exemplary embodiments of the invention with reference to the attached drawings.

Figure 2:
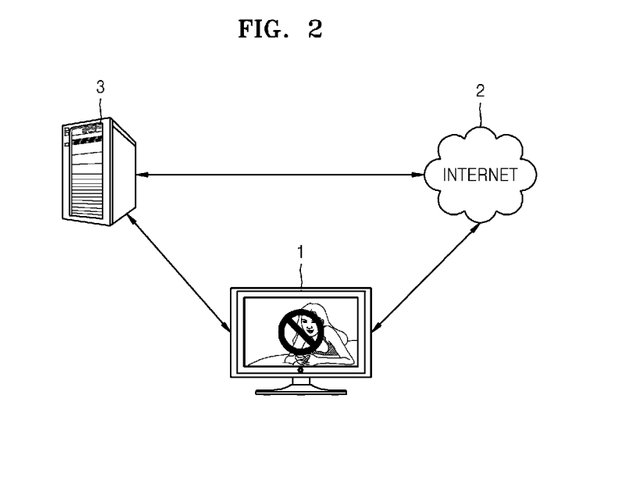
FIG. 2 is a structural diagram of an IPTV broadcasting system according to an exemplary embodiment of the present invention.

FIG. 2 is a structural diagram of an IPTV broadcasting system according to an exemplary embodiment of the present invention.

Referring to FIG. 2, the IPTV broadcasting system according to the current exemplary embodiment of the present invention includes an IPTV 1, a CA information server 3, and the Internet 2.

The IPTV 1 according to the current exemplary embodiment of the present invention is an IP-based TV broadcast receiving and/or displaying device/system and should be understood as a comprehensive concept including broadband TVs and IPTVs.

The IPTV 1 may download and reproduce various multimedia contents existing on the Internet 2, in addition to broadcasting programs which are multicast by IPTV broadcasting stations.

The CA information server 3 according to the current exemplary embodiment of the present invention generates CA information on the various multimedia contents existing on the Internet 2. The generated CA information is transmitted to the IPTV 1 in accordance with a request of the IPTV 1. The CA information server 3 is an independent device that is physically and logically separated from IPTV broadcasting stations or multimedia content producers.

Figure 3:
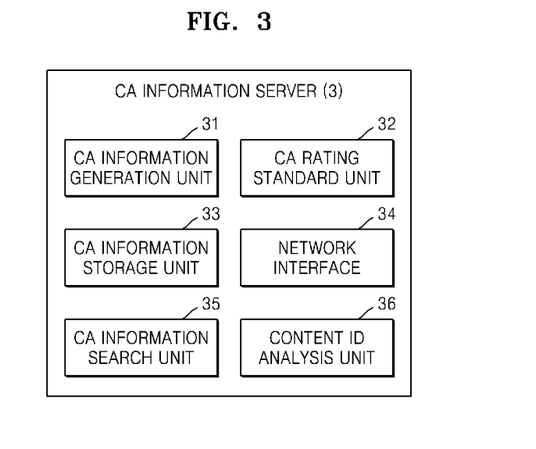
FIG. 3 is a detailed functional block diagram of a CA information server illustrated in FIG. 2, according to an exemplary embodiment of the present invention.

FIG. 3 is a detailed functional block diagram of the CA information server 3 illustrated in FIG. 2, according to an exemplary embodiment of the present invention.

Referring to FIG. 3, the CA information server 3 includes a CA information generation unit 31, a CA rating standard unit 32, a CA information storage unit 33, a network interface 34, a CA information search unit 35, and a content identification (ID) analysis unit 36. The CA rating standard unit 32 stores CA rating information such as information on viewing age restrictions.

Figure 4:
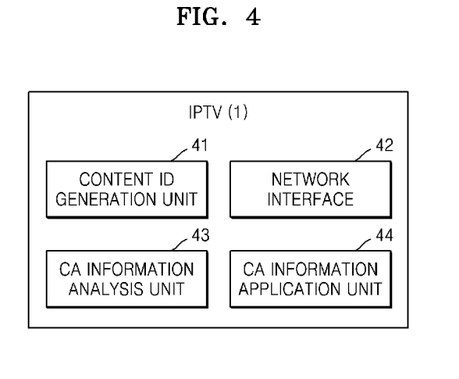
FIG. 4 is a detailed functional block diagram of an IPTV illustrated in FIG. 2, according to an exemplary embodiment of the present invention.

FIG. 4 is a detailed functional block diagram of the IPTV 1 illustrated in FIG. 2, according to an exemplary embodiment of the present invention.

Referring to FIG. 4, the IPTV 1 includes a content ID generation unit 41, a network interface 42, a CA information analysis unit 43, and a CA information application unit 44.

The content ID generation unit 41 according to the current exemplary embodiment of the present invention is used to generate a particular ID of each content. For example, the content ID generation unit 41 may generate a hash value by using data of the content.

The CA information application unit 44 includes preset information about items which the viewer(s) do not like to view (hereinafter referred to as "phobia information"). The phobia information may be directly set by a user or be automatically set by the IPTV 1 trough monitoring a viewing pattern of the user.

Figure 5:
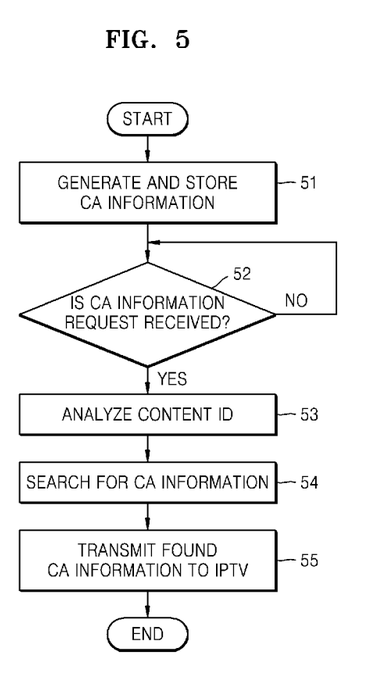
FIG. 5 is a flowchart of a method of generating and providing CA information by using the CA information server illustrated in FIGS. 2 and 3, according to an exemplary embodiment of the present invention.

FIG. 5 is a flowchart of a method of generating and providing CA information by using the CA information server 3 illustrated in FIGS. 2 and 3, according to an exemplary embodiment of the present invention. FIG. 5 will be described in conjunction with FIGS. 2 and 3.

Referring to FIG. 5, initially, in operation 51, the CA information generation unit 31 of the CA information server 3 selects contents not having the CA information from among multimedia contents existing on the Internet 2, and then generates the CA information on the selected contents. In this case, the CA information generation unit 31 may determine details of the CA information to be generated, by referring to the CA rating information stored in the CA rating standard unit 32 or a user's input. According to an exemplary embodiment of the present invention, the CA information generation unit 31 may generate particular IDs (for example, hash values) of the contents in order to uniquely identify each of contents. The generated CA information and the IDs of the contents are stored in the CA information storage unit 33 (operation 51).

Operations 52 through 55 are related to a method of providing the CA information generated and stored by the CA information generation unit 31 in operation 51, to the IPTV 1.

The CA information server 3 receives an ID of a content together with a request for the CA information on the content, from the IPTV 1 through the network interface 34 (operation 52).

The CA information server 3 recognizes the request for the CA information and instructs the content ID analysis unit 36 to analyze the received ID of the content (operation 53).

The CA information search unit 35 searches the CA information storage unit 33 in order to obtain the CA information corresponding to the ID, by referring to an analysis result of the content ID analysis unit 36 (operation 54).

The CA information server 3 transmits the CA information found in operation 54 to the IPTV 1 who has requested for the CA information (operation 55).

Figure 6:
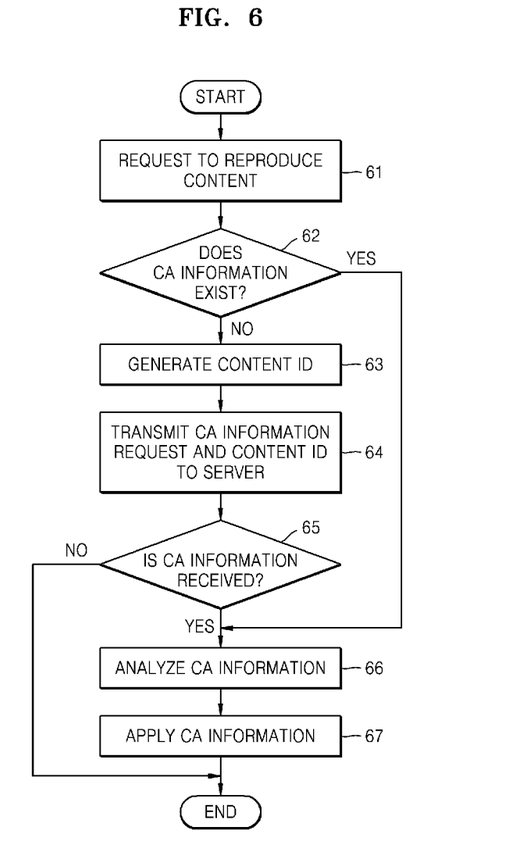
FIG. 6 is a flowchart of a method of using CA information by using the IPTV illustrated in FIGS. 2 and 4, according to an exemplary embodiment of the present invention.

FIG. 6 is a flowchart of a method of using CA information by using the IPTV 1 illustrated in FIGS. 2 and 4, according to an exemplary embodiment of the present invention. FIG. 6 will be described in conjunction with FIGS. 2 through 4.

Referring to FIG. 6, if a user selects a content by using, for example, a remote controller and requests the IPTV 1 to reproduce the selected content (operation 61), the IPTV 1 initially determines whether the CA information is included in a file of the content to be reproduced (operation 62).

If the CA information is included in the file of the content to be reproduced, the IPTV 1 immediately reproduces the content and analyzes/applies the CA information at the same time (operations 66 and 67).

On the other hand, if the CA information is not included in the file of the content to be reproduced, the IPTV 1 initially instructs the content ID generation unit 41 to generate a particular ID of the content to be reproduced. The content ID generation unit 41 generates the particular ID (for example, a hash value) of the content by using data of the content (operation 63).

The IPTV 1 transmits a request for the CA information on the content and the ID of the content, which is generated in operation 63, to the CA information server 3 through the network interface 42.

If the CA information server 3 searches for the requested CA information and transmits the CA information to the IPTV 1 through the network interfaces 34 and 42, in response to the request for the CA information (operation 65), the CA information analysis unit 43 analyzes (for example, parses) the received CA information (operation 66).

Lastly, in operation 67, the CA information application unit 44 applies the CA information based on a parsing result of the CA information analysis unit 43. In more detail, in accordance with CA information, the CA information application unit 44 restricts reproduction of the whole content (for example, restricts viewing of the content) or restricts reproduction of a part of image or speech data to be reproduced.

Figure 7:
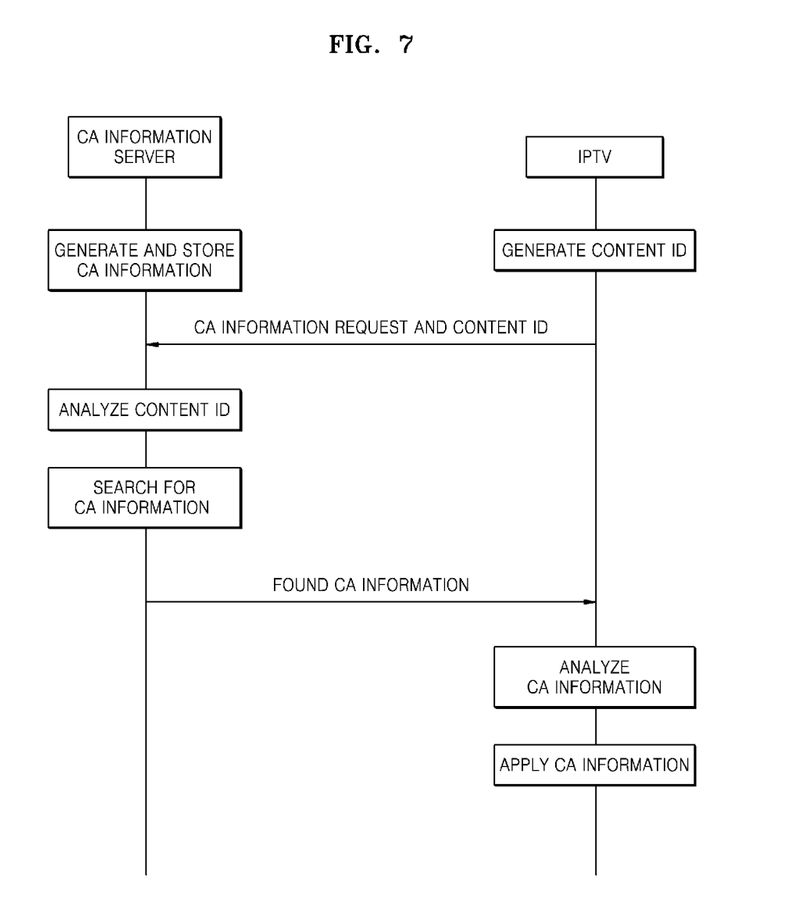
FIG. 7 is a diagram illustrating sequential operations of the methods of FIGS. 5 and 6, for convenience of understanding.

FIG. 7 is a diagram illustrating sequential operations of the methods of FIGS. 5 and 6, for convenience of understanding.

In FIG. 7, left and right vertical lines respectively indicate independent operations of the CA information server 3 illustrated in FIGS. 2 and 3, and the IPTV 1 illustrated in FIGS. 2 and 4, and horizontal lines indicate mutual operations such as information exchange, between the CA information server 3 and the IPTV 1.

FIGS. 8A, 8B, 9, 10, and 11 show various examples of CA information according to exemplary embodiments of the present invention.

Figure 8A:
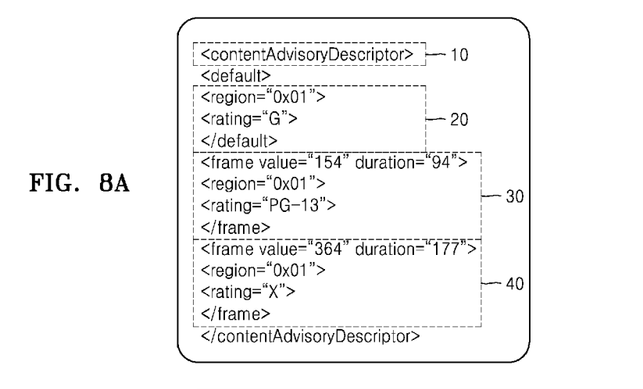
FIG. 8A is a diagram showing a CA descriptor as an example of CA information according to an exemplary embodiment of the present invention.

FIG. 8A is a diagram showing a CA descriptor as an example of CA information according to an exemplary embodiment of the present invention. The CA descriptor is metadata of an extensible markup language (XML) format, and uses a CA rating standard that is defined by the Advanced Television Systems Committee (ATSC).

Referring to FIG. 8A, a first tag portion 10 indicates a beginning of the CA information (or metadata).

A second tag portion 20 of "<default>", if not differently designated, designates a default rating of CA, which is applied to frames included in a broadcasting stream. Here, the default rating is designated as "G".

Figure 8B:
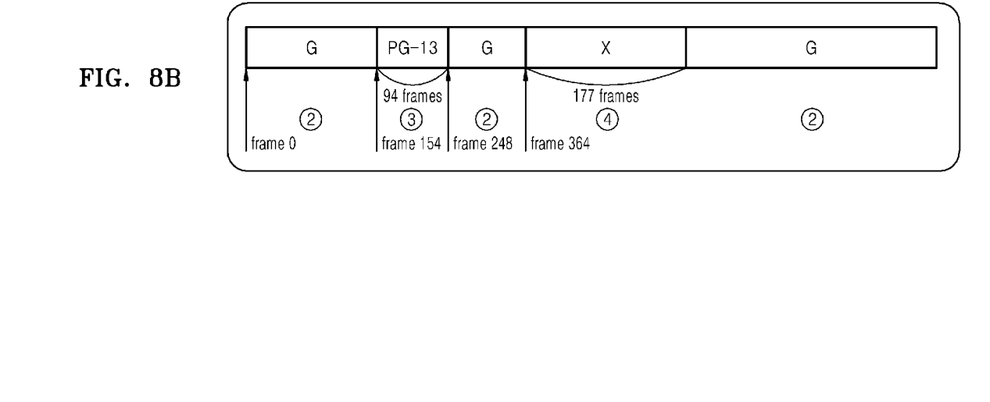
FIG. 8B is a diagram showing variations in ratings of a broadcasting stream in accordance with the CA descriptor shown in FIG. 8A.

Third and fourth tag portions 3 and 4 designate certain frames as other ratings which are not the default rating "G". The third tag portion 30 designates ninety four sequential frames starting with frame No. 154, to have a "PG-13" rating, and the fourth tag portion 40 designates one hundred seventy seven sequential frames starting with a frame No. 364, to have a "X" rating. FIG. 8B is a diagram showing variations in ratings of a broadcasting stream in accordance with the CA descriptor shown in FIG. 8A.

Figure 9:
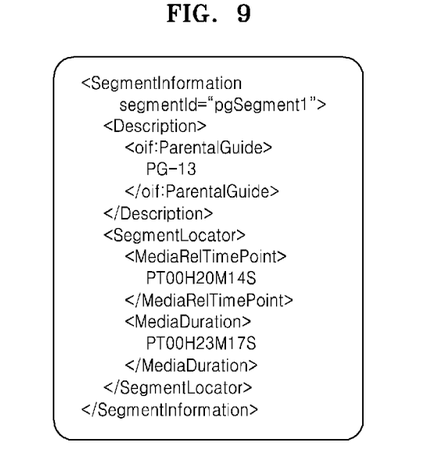
FIG. 9 is a diagram showing a broadband content guide (BCG) into which rating information, that is, a parental guide is inserted, as an example of CA information according to another exemplary embodiment of the present invention.

FIG. 9 is a diagram showing a broadband content guide (BCG) into which rating information, that is, a parental guide is inserted, as an example of CA information according to another exemplary embodiment of the present invention.

Referring to FIG. 9, in order to designate a CA rating during a certain segment of a broadcasting program, a "PG-13" rating is designated by adding an "oif:ParentalGuide" element to a description element. MediaRelTimePoint and MediaDuriation of a program to which the "PG-13" rating is applied, are included in a segment locator element. In more detail, the "PG-13" rating is applied during a segment (duration: 23 minutes, 17 seconds) from 20 minutes, 14 seconds to 43 minutes, 31 seconds of the program. Such CA information may be applied to an Optical Internetworking Forum (OIF) standard by adding the CA information to the Digital Video Broadcasting-Internet Protocol (DVB-IP) BCG of the OIF.

Figure 10:
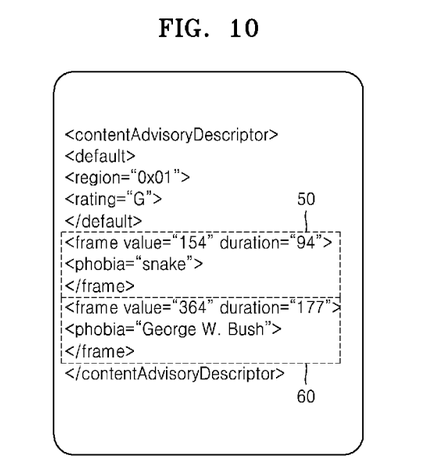
FIG. 10 is a diagram showing a CA descriptor for blocking reproduction of portions of a content, which correspond to phobias of the viewer, as an example of CA information according to another exemplary embodiment of the present invention.

FIG. 10 is a diagram showing a CA descriptor for blocking reproduction of portions of a content, which correspond to phobias of the viewer, as an example of CA information according to another exemplary embodiment of the present invention.

Referring to FIG. 10, if the content includes frames on which a "snake" appears, those frames are indicated on a first <phobia> portion 50. Also, if the content includes frames on which "George W. Bush" appears, those frames are indicated on a second <phobia> portion 60.

If "snake" and "George W. Bush" are preset as phobia information of the viewer in the CA information application unit 44 of the IPTV 1 illustrated in FIGS. 2 and 4, the CA information application unit 44 restricts viewing of corresponding frames by blocking reproduction of the frames by referring to the CA descriptor of FIG. 10.

Figure 11:
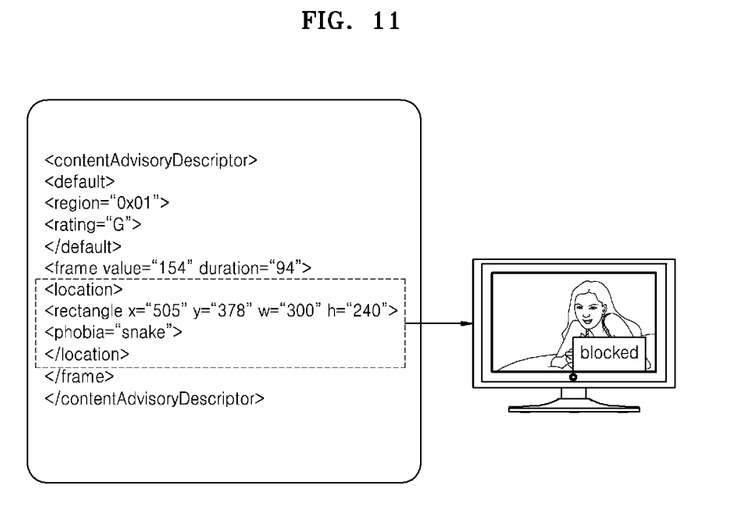
FIG. 11 is a diagram showing a CA descriptor for blocking reproduction of a partial region of a frame (or screen), as an example of CA information according to another exemplary embodiment of the present invention.

FIG. 11 is a diagram showing a CA descriptor for blocking reproduction of a partial region of a frame (or screen), as an example of CA information according to another exemplary embodiment of the present invention.

FIGS. 8A, 8B, 9, and 10 show examples when whole frames are blocked from being reproduced. However, in FIG. 11, only a partial region of a frame is blocked from being reproduced.

Referring to FIG. 11, a tag portion of "<location>" designates x and y coordinates, width, and height of a blocked region and thus a corresponding region indicated as "blocked" is blocked from being reproduced. In FIG. 11, the blocked region has a rectangular shape. However, according to another exemplary embodiment of the present invention, the blocked region may have any other shape. If the blocked region has a circular shape, the CA descriptor may designate as, for example, <circle X="385", y="210", radius="50">.

The present invention can also be implemented as computer-readable code on a computer-readable recording medium. The computer-readable recording medium is any data storage device that can store data which can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network-coupled computer systems so that the computer-readable code is stored and executed in a distributed fashion.

As described above, according to the exemplary embodiments of the present invention, CA information on Internet contents is provided in addition to contents transmitted from broadcasting stations and thus viewers may protect themselves from harmful contents on the Internet.

According to the exemplary embodiments of the present invention, CA information is provided in units of frames of the contents and thus more specified CA functions on contents may be performed.

The exemplary embodiments of the present invention use metadata of an XML format and thus, if a user desires, additional CA information may be provided in addition to conventional CA information. Accordingly, a user-customized CA function may be enabled.

The exemplary embodiments of the present invention may create a new commercial service model for generating and providing CA information on Internet contents.

The exemplary embodiments of the present invention provide a possibility to lead standardization in this field by suggesting a new methodology of providing CA information, which may be applied if or when IPTVs become popular in the future.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of providing content advisory (CA) information, the method comprising:
    receiving, at a CA information server, a request for CA information on a content, the request including an identification (ID) of the content, from an Internet Protocol television (IPTV);
    searching for CA information on the content corresponding to the ID of the content by using the ID of the content based on the request, at the CA information server; and
    transmitting the CA information on the content, which is found as a result of the searching, from the CA information server to the IPTV,
    wherein the CA information server is independent from a server providing the content to the IPTV.

2. The method of claim 1, wherein the CA information server generates and stores, in advance, CA information on contents for which CA information is not found.

3. The method of claim 1, wherein the searching for the CA information comprises searching for the CA information on the content corresponding to the ID by using the ID of the content.

4. The method of claim 1, wherein the CA information is described in an extensible markup language (XML) format.

5. The method of claim 1, wherein the CA information is utilized to perform a CA function in units of frames of content.

6. The method according to claim 1, wherein the content is selected by a user and the CA information on the content selected by the user is transmitted to the IPTV.

7. A method of using content advisory (CA) information when an Internet Protocol television (IPTV) reproduces a content not having CA information, the method comprising:
    transmitting a request for CA information of a content, the request including an ID of the content, from the IPTV to a CA information server;
    receiving the CA information of the content corresponding to the ID of the content from the CA information server at the IPTV;
    analyzing the CA information at the IPTV; and
    applying the CA information to reproduction of the content at the IPTV,
    wherein the CA information server is independent from a server providing the content to the IPTV.

8. The method of claim 7, further comprising determining whether the content to be reproduced by the IPTV has the CA information.

9. The method of claim 8, further comprising generating an identification (ID) of the content if it is determined that the content to be reproduced by the IPTV does not have the CA information.

10. The method of claim 7, wherein the CA information is utilized to perform a CA function in units of frames of the content.

11. The method of claim 7, wherein the CA information includes information on viewing age restrictions.

12. The method of claim 7, wherein the CA information includes information for blocking reproduction of an image corresponding to a viewer phobia.

13. The method of claim 7, wherein the CA information includes information for blocking reproduction of a partial region of a screen.

14. A content advisory (CA) information server comprising:
    a CA information storage unit which stores CA information;
    a content identification (ID) analysis unit which analyzes an ID of a content requiring the CA information; and
    a CA information search unit which searches the CA information storage unit in order to obtain the CA information of the content corresponding to the ID of the content, by using the ID of the content, in accordance with a request of an Internet Protocol television (IPTV),
    wherein the CA information server is independent from a server providing the content to the IPTV.

15. The CA information server of claim 14, further comprising a CA rating standard unit which stores CA rating information.

16. The CA information server of claim 14, further comprising a CA information generation unit for generating the CA information on contents not having CA information.

17. A content advisory (CA) information management system comprising:
    a CA information server which provides CA information on a multimedia content corresponding to an identification (ID) of the multimedia content, the multimedia content being provided via the Internet; and
    an Internet Protocol television (IPTV) which controls reproduction of the multimedia contents by using the CA information wherein the CA information server is independent from a server providing the content to the IPTV.

18. An Internet Protocol television (IPTV) comprising:
a content ID generation unit which generates an identification (ID) for identifying a content;
a CA information analysis unit which parses the CA information on the content; and
a CA information application unit which performs a CA function by referring to a result of the parsing by the CA information analysis unit,
wherein the IPTV obtains the CA information corresponding to the ID of the content from a CA information server, by using the ID of the content wherein the CA information server is independent from a server providing the content to the IPTV.

19. A computer readable recording medium having recorded thereon a computer program for executing a method of providing content advisory (CA) information, the method comprising:
receiving, at a CA information server, a request for CA information on a content, the request including an identification (ID) of the content, from an Internet Protocol television (IPTV);
searching for CA information on the content corresponding to the ID of the content by using the ID of the content based on the request, at the CA information server; and
transmitting the CA information on the content, which is found a result of the searching, from the CA information server to the IPTV,
wherein the CA information server is independent from a server providing the content to the IPTV.

20. A computer readable recording medium having recorded thereon a computer program for executing a method of using content advisory (CA) information when an Internet Protocol television (IPTV) reproduces a content not having the CA information, the method comprising:
transmitting a request for CA information of a content, the request including an ID of the content, from the IPTV to a CA information server;
receiving the CA information of the content corresponding to the ID of the content from the CA information server at the IPTV;
analyzing the CA information at the IPTV; and
applying the CA information to reproduction of the content at the IPTV,
wherein the CA information server is independent from a server providing the content to the IPTV.

* * * * *